(12) United States Patent
McCay

(10) Patent No.: US 7,721,406 B2
(45) Date of Patent: May 25, 2010

(54) RESISTANCE WELDED WIRE TO HOLLOW TUBING JOINTS AND METHOD

(75) Inventor: Jeffrey A. McCay, Athens, TN (US)

(73) Assignee: L & P Property Management Company, South Gate, CA (US)

( * ) Notice: Subject to any disclaimer, the term of this patent is extended or adjusted under 35 U.S.C. 154(b) by 0 days.

(21) Appl. No.: 11/041,917

(22) Filed: Jan. 24, 2005

(65) Prior Publication Data

US 2005/0188524 A1  Sep. 1, 2005

Related U.S. Application Data

(60) Provisional application No. 60/538,338, filed on Jan. 22, 2004.

(51) Int. Cl.
    *B21D 39/00*  (2006.01)
(52) U.S. Cl. ....................................... 29/509
(58) Field of Classification Search ............ 29/509, 29/512, 525.06, 447, 505, 524.1; 72/364, 72/342.96, 318; 248/503.1; 24/265 CD; 297/253
    See application file for complete search history.

(56) References Cited

U.S. PATENT DOCUMENTS 3,396,567 A * 8/1968 Bachmann ................ 72/318
5,054,301 A * 10/1991 Soga et al. ................. 72/13.5
5,941,601 A * 8/1999 Scott et al. ................ 297/253
6,983,526 B2 * 1/2006 Duffy et al. ................ 29/514
7,131,693 B2 * 11/2006 Smallwood et al. ........ 297/253
2004/0080194 A1 * 4/2004 Medvecky et al. ......... 297/253

OTHER PUBLICATIONS

Federal Motor Vehicle Safety Standards and Regulations, 49 CFR, Ch. V, Section 571.225, 2005, pp. 825-862.
International Search Report for PCT/US2005/02152.

* cited by examiner

*Primary Examiner*—John C Hong
(74) *Attorney, Agent, or Firm*—Kang Intellectual Property Law, LLC; Grant D. Kang

(57) ABSTRACT

Upset forging is utilized to join formed wire (40) to metal tubing (20). The ends (41) of formed wires (40) are passed completely across the width of the tube and heating electrodes (74) positioned only on the side of the tubing (20) from which the ends protrude and only the protruding ends (41) are heated to a plastic state. Back plates (30) are employed about the ends (41) to facilitate the upset forging process. An improved ISOFIX support is provided wherein a wire (40) is mounted across the width of a tube (20) and a bracket (30) placed over the wire (40) in contact with the tube (20) and these components are held together by upset forging the wire ends (41).

4 Claims, 20 Drawing Sheets

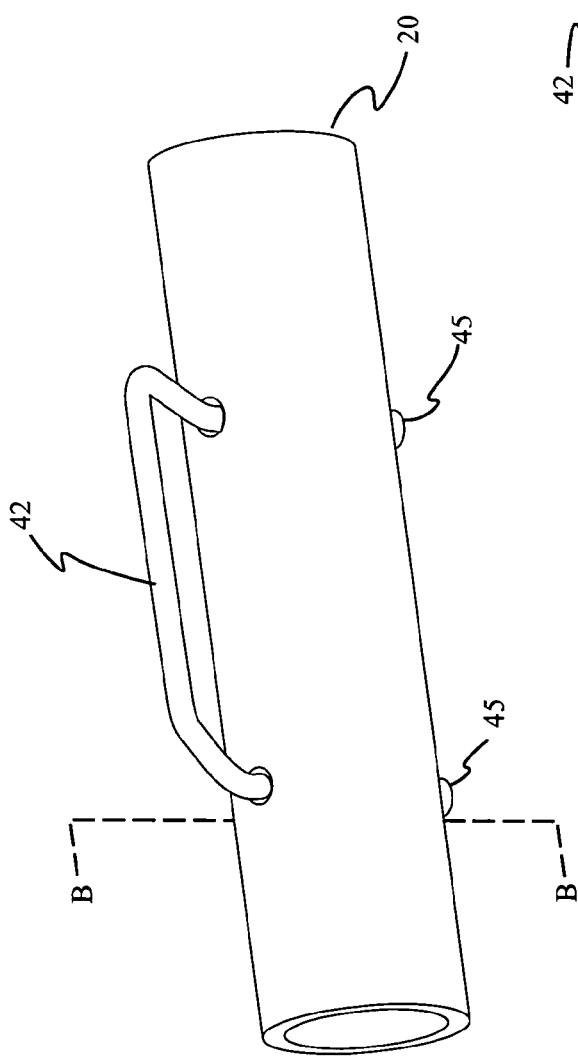
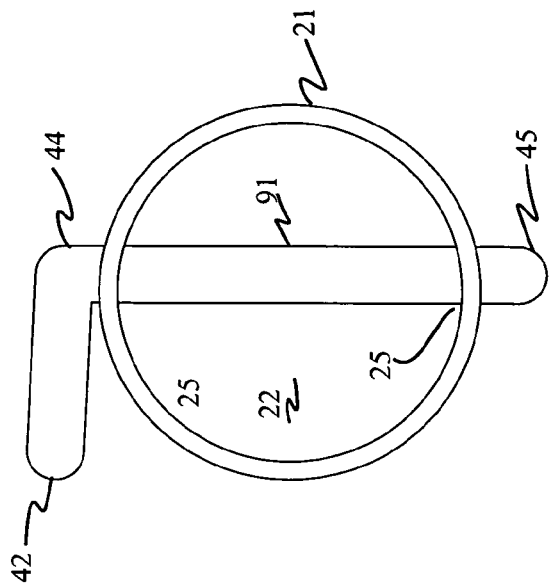
Figure 2A
Figure 2B

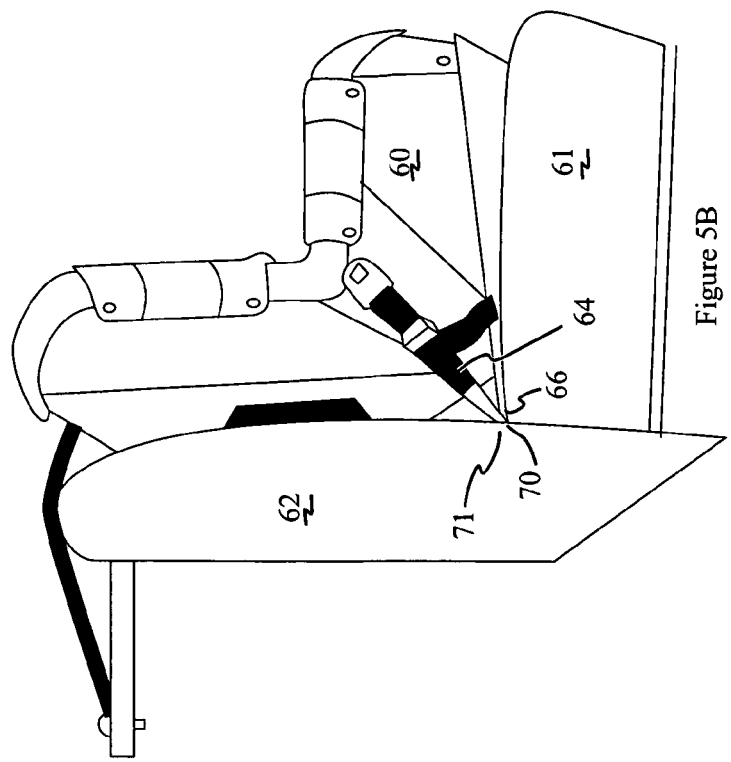
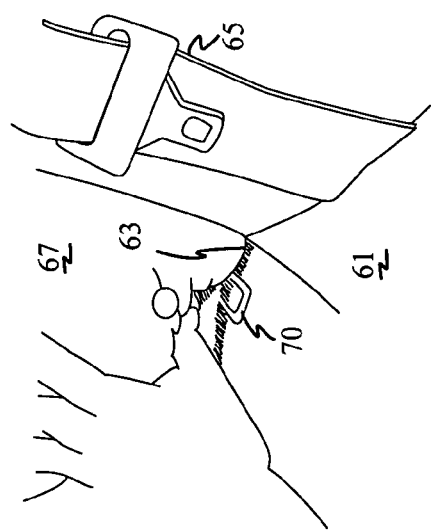
Figure 5A
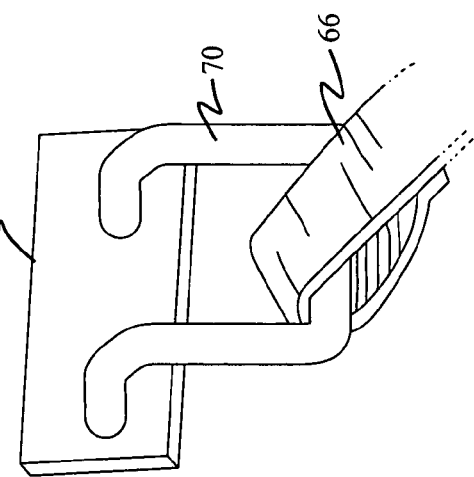
Figure 5C
Figure 5B

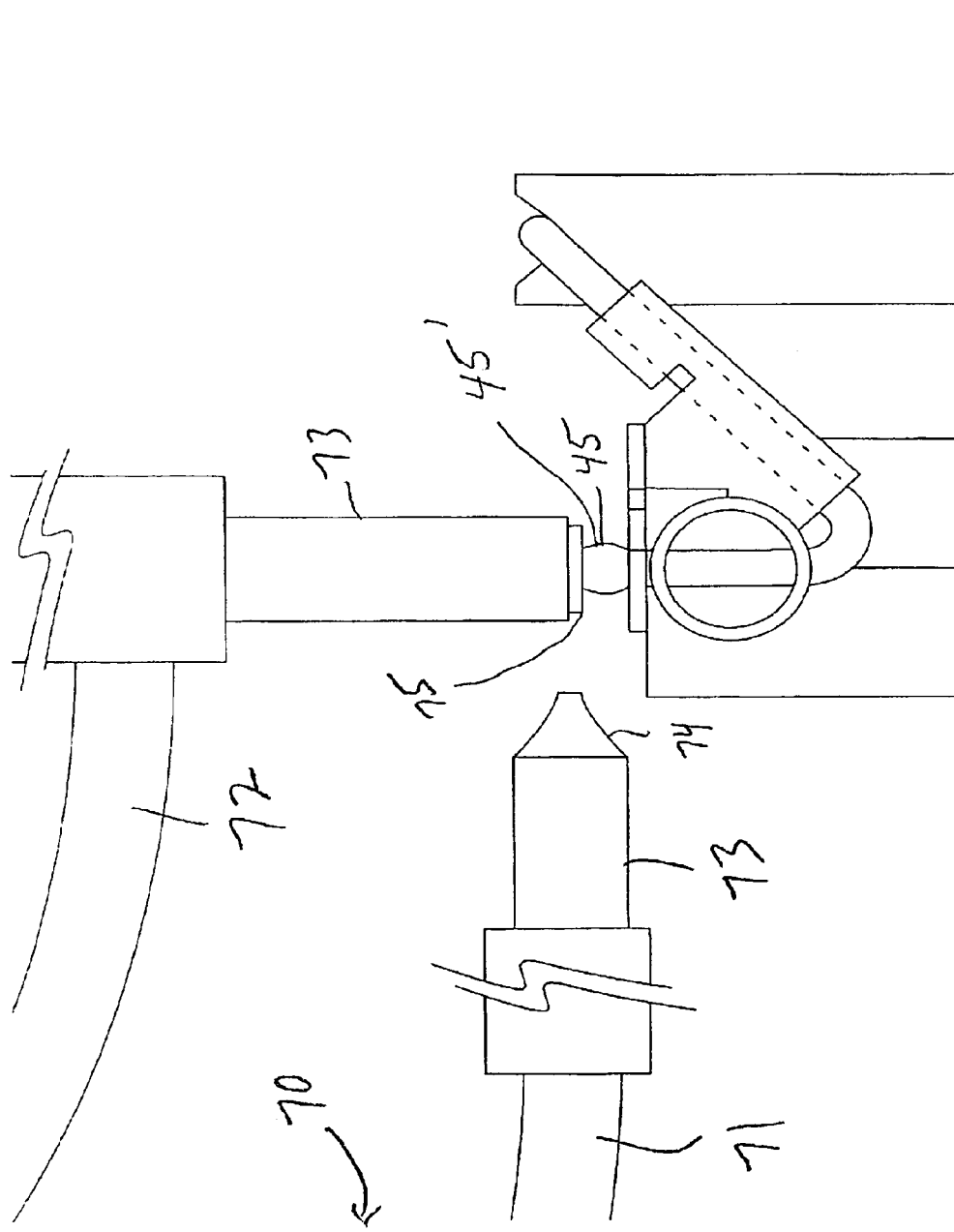

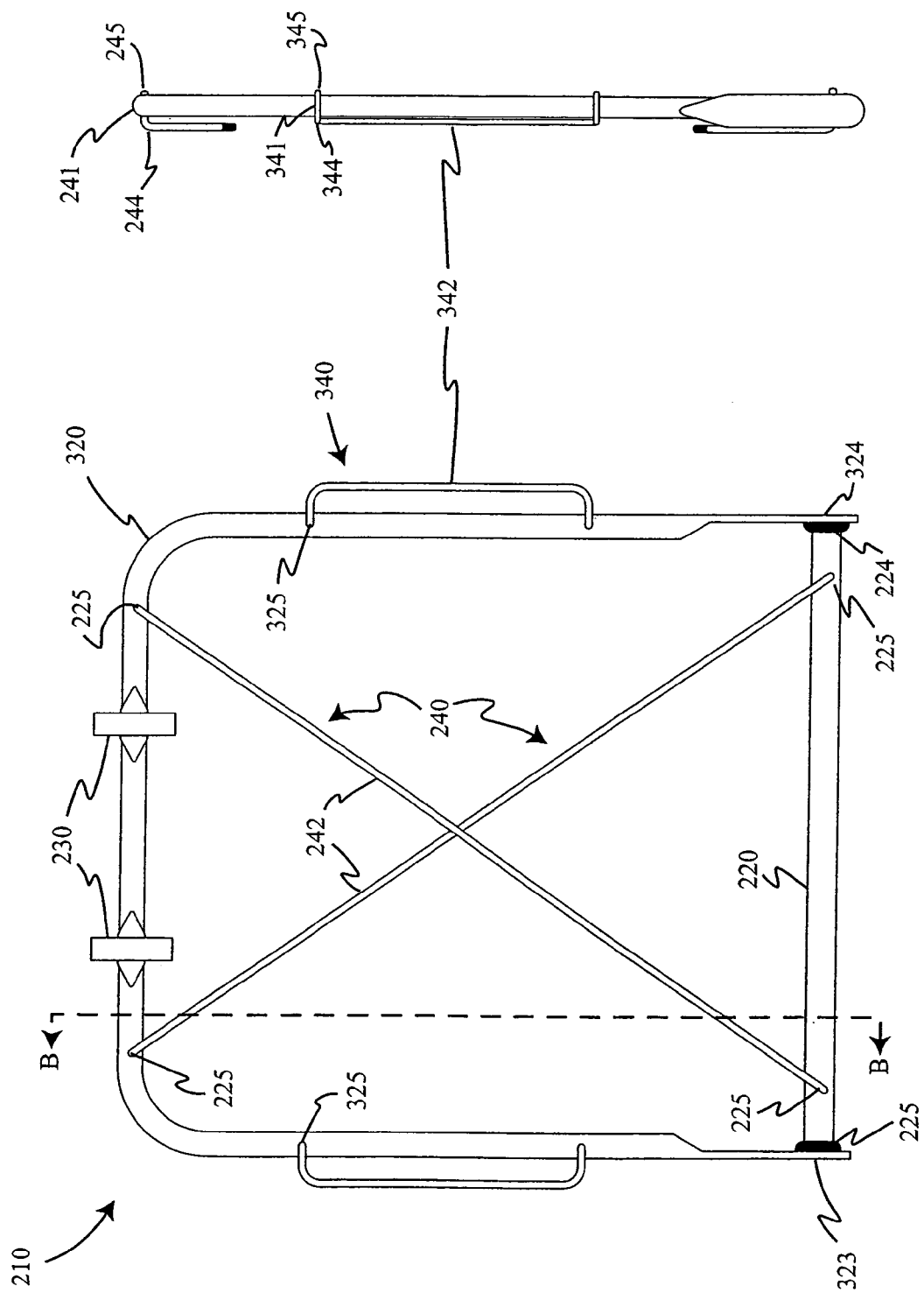

RESISTANCE WELDED WIRE TO HOLLOW TUBING JOINTS AND METHOD

CROSS REFERENCES TO RELATED APPLICATIONS

This application claims priority to U.S. Application No. 60/538,338 filed on Jan. 22, 2004.

FIELD OF THE INVENTION

This invention is in the field of wire forming and joining, and especially the use of upset forging to join wire to hollow tubing.

BACKGROUND OF THE INVENTION

Wire forming manufacturing allows the rapid creation of custom parts by shaping wire feed stock often having diameters of about 0.25 inches, though wire forming is practiced over a wide range of wire diameters. When wire formed components are joined together, typically by spot welding, relatively strong and lightweight frames may be created. Wire formed structures have found widespread acceptance throughout the automotive industry due to the strength, weight, and resiliency of these parts.

Joining wire formed components to flat metal parts has not presented substantial difficulties for the wire forming industry. The wire may in some cases be welded to the flat component or even more advantageously might pass through an aperture in the flat component, in which case electric current may be applied to the wire on each side of the aperture thereby heating the end of the wire that has proceeded through the aperture to a plastic state. When heated, the metal wire may be deformed against the flat part to form a hot upset weld. Hot upset forging or welding is a well known technique for enlarging elongated work pieces at selected points and is described generally in Bachmann, U.S. Pat. No. 3,396,567.

Although the ability to join formed wire to flat metal pieces is desirable and necessary, in many instances it is preferable to join wire formed pieces to metal tubing. Hollow metal tubing generally provides a greater strength to weight benefit than solid flat metal pieces. Traditionally, wire formed parts have either been welded to metal tubes or mounted in brackets welded to the metal tubes, however, the spot welding processes typically used have required relatively long cycle times, have not produced sufficiently uniform welds, and have resulted in defects and rattles because of weld splatter and weld slag. Prior attempts to utilize resistance heating and upset forging techniques when joining wire forms to tubing have not been successful because the entire segment of wire passing through the hollow tube as well as the end portion extending from the tube have been heated to a plastic state. Attempts to upset the portion of the wire extending through the tubing have generally resulted in simply creating a mass of metal within the tube.

BRIEF SUMMARY OF THE INVENTION

It is therefore an object of the invention to provide a technique for joining wire formed parts to hollow metal tubes in a consistent fashion in spite of minor component variations typical among wire formed parts.

It is yet another object of the invention to produce uniform joining of wire formed parts to metal tubes with a bond that may be visually and mechanically inspected easily.

It is yet another object of the invention to provide a method of joining wire formed parts to hollow tubes that presents little risk of burn through of the parts, weld splatter, or weld slag.

It is a further object of the invention to decrease the long cycle times required for joining wire formed parts to metal tubes by spot welding and to decrease the consumable costs for such joinings.

It is yet a further object of the invention to provide a process for joining wire formed parts to metal tubes of a dissimilar metal alloy.

According to the objects of the invention, a hot upset forging process is utilized where current is applied only to the end of the wire that has passed through openings in both walls of the metal tube, thereby rendering only the end of the wire into a plastic state. Mechanical pressure is then applied to the heated and plastic end of the wire mechanically locking the wire to the metal tube. Because current is not passed through the portion of the wire within the metal tube, structural integrity of that portion of the wire remains even when pressure is applied to the end, and the heated plastic end cannot be pushed to the interior of the tube but must instead be deformed on the outer surface of the tube.

These and other objects of the invention will become apparent in connection with the detailed explanation of the preferred embodiments of the invention below.

BRIEF DESCRIPTIONS OF THE DRAWINGS

In the accompanying drawings:

FIG. 2A is a perspective view of a formed metal wire mounted through apertures in the sides of the tube.

FIG. 2B is an end view of the tube and formed wire of FIG. 2A taken along line B-B.

FIG. 5A illustrates the location of an ISOFIX anchor in an automobile seat.

FIG. 5B illustrates the attachment of an infant's car seat to an ISOFIX anchor.

FIG. 5C illustrates a prior art ISOFIX anchor in isolation.

FIG. 9C shows the hot upsetting of the heated ends of the formed wire according to the present invention.

FIG. 10A is a plan view of another representative assembly of tubing joined to formed wire components.

FIG. 10B is a side sectional view of the assembly of FIG. 10A showing the use of hot upset forging to secure formed wire components to the tubing of the assembly.

DETAILED DESCRIPTION OF THE INVENTION

Figure 1:
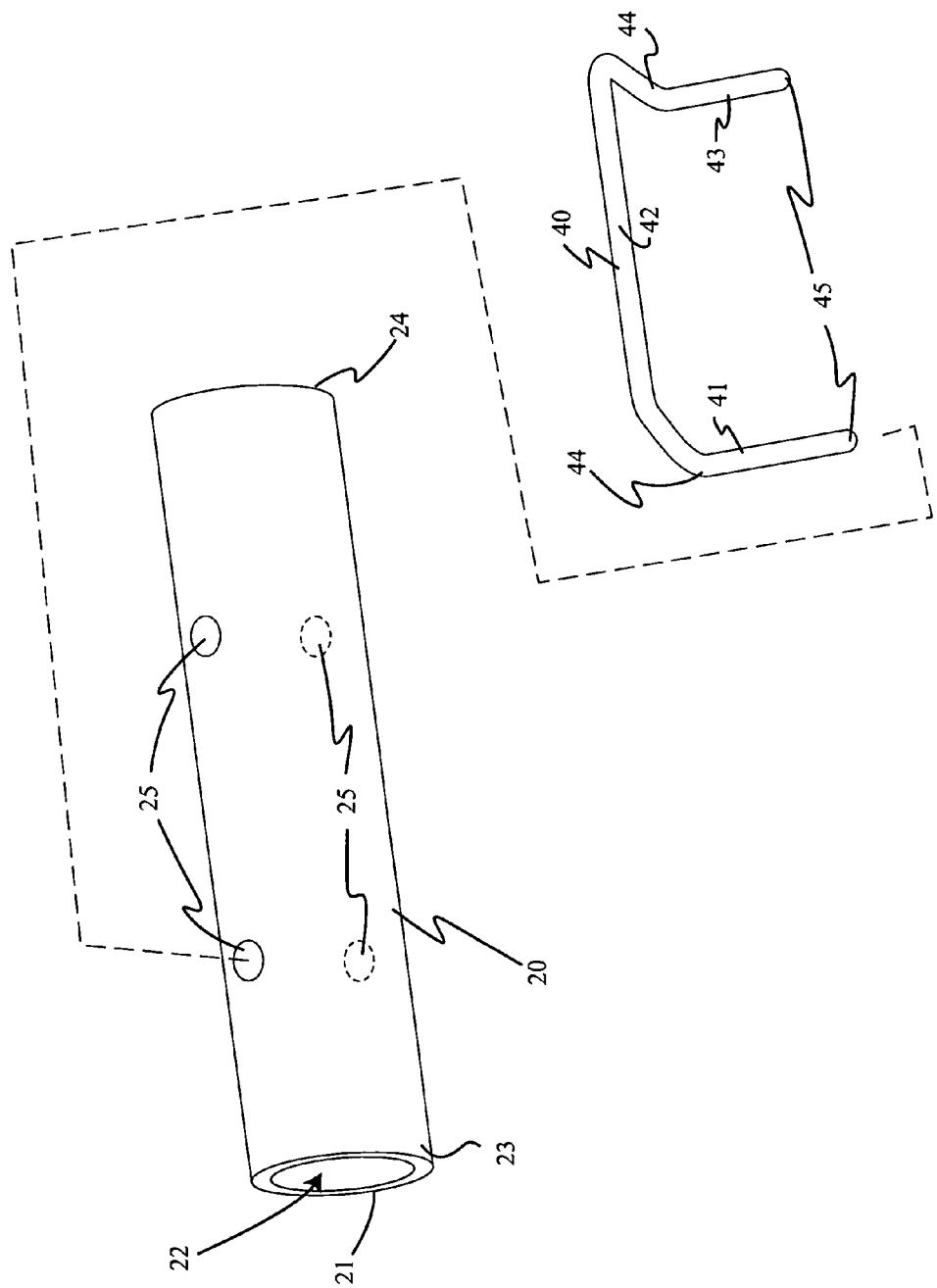
FIG. 1 is an exploded perspective view of a tube and a formed metal wire intended to be secured to a tube.

In FIG. 1, representative tube 20 and formed wire 40 are shown. Tube 20 is formed of a cylindrical wall 21 of metal defining lumen 22 and has a first end 23 and opposite second end 24. Openings 25 on the exterior surface of tube 20 define pathways that proceed substantially through the center point of the cross section of the tube to openings 25' on the opposite tube wall. The work piece 40 has a central section 42 and a first leg section 41 and second leg section 43, each having an end 45. Between the legs 41, 43 and central portion 42 is typically a bend 44 in the wire form 40.

The formed wire 40 is shown with legs 41, 43 inserted through apertures 25, 25' in FIG. 2A. The ends 45 of leg portions 41, 43 extend through the lumen 22 of the tube and out the opposite side of the tube wall 21 through openings 25'. FIG. 2B is a sectional view taken along line B-B of FIG. 2A and shows the first leg portion 41 extending substantially through the center of the lumen 22 and end 45 extending beyond the tube wall 21.

Figure 3B:
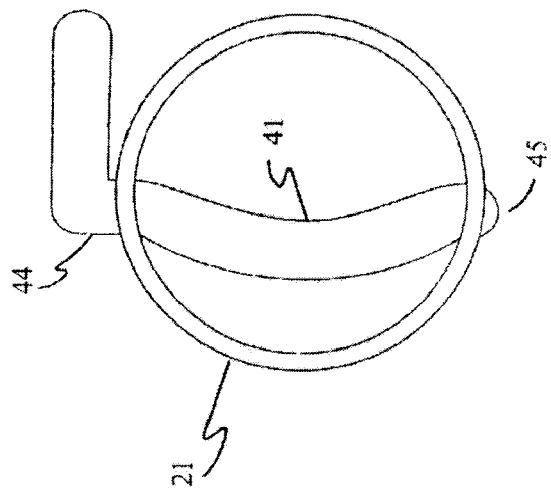
FIG. 3B is the result of the hot upset forging applied to the conventional assembly of FIG. 3A.
Figure 3A:
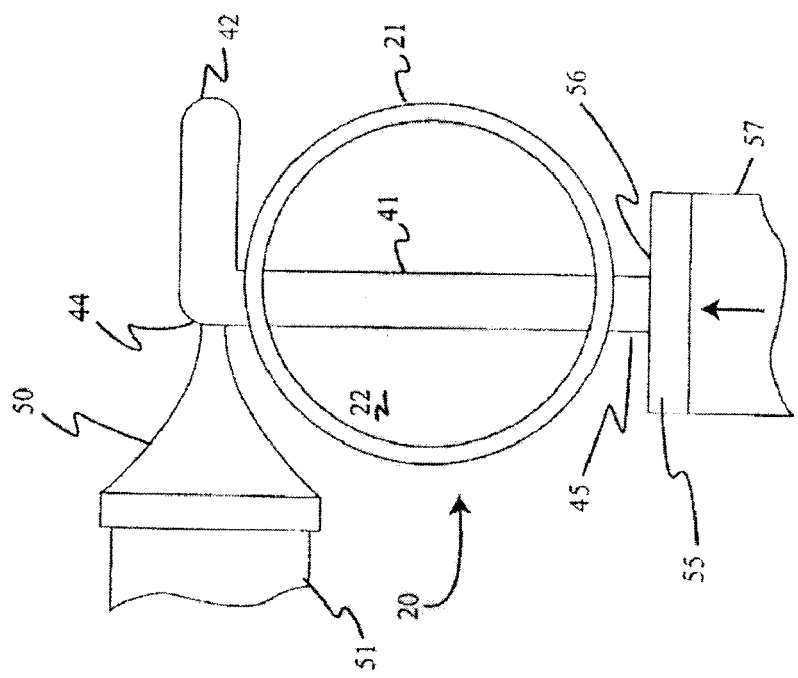
FIG. 3A is an end view of a wire and tube with electrodes attached for conventional hot upset forging.

In the conventional application of resistance heating, a first electrode 50 is applied to the formed wire 40 on one side of the work piece to which it is to be joined, in this instance tube 20, and the second electrode 55 is applied to the formed wire 40 on the opposite side of the work piece. When utilized with a work piece that is a solid piece of metal, this presents no issues; however, the open lumen 22 of tube 20 provides no support for the leg portion 41 extending across the lumen of the tube. Accordingly, when current is applied by first electrode 50 to formed wire 40 on one side of tube 20 so that current may pass through leg 41 to second electrode 55 on the opposite side of tube 20, the entire portion of leg 41 between electrodes 50 and 55 is heated to a plastic state. As shown in FIGS. 3A and 3B when pressure is applied by anvil electrode 55, leg 41 simply deforms and there is little thickening or upsetting of end 45 to lock formed wire 40 into a fixed relation with tube 20.

Figure 4B:
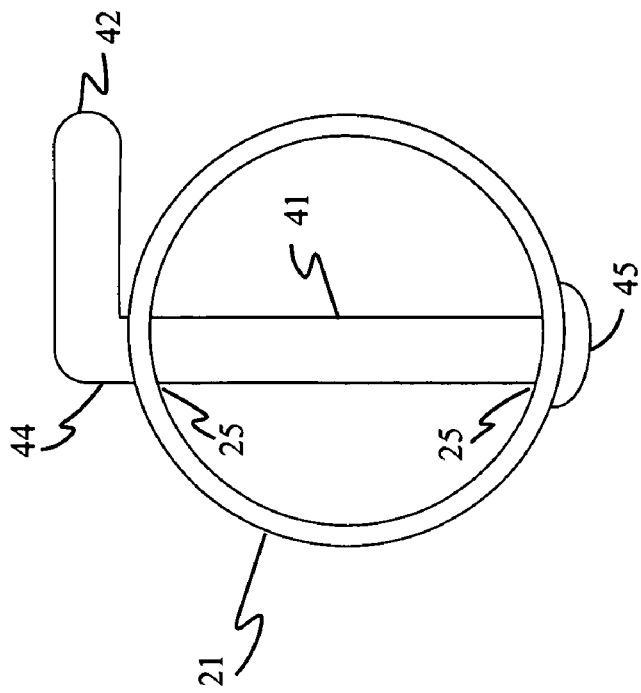
FIG. 4B is the result of hot upset of the wire form to the tube according to the invention.
Figure 4A:
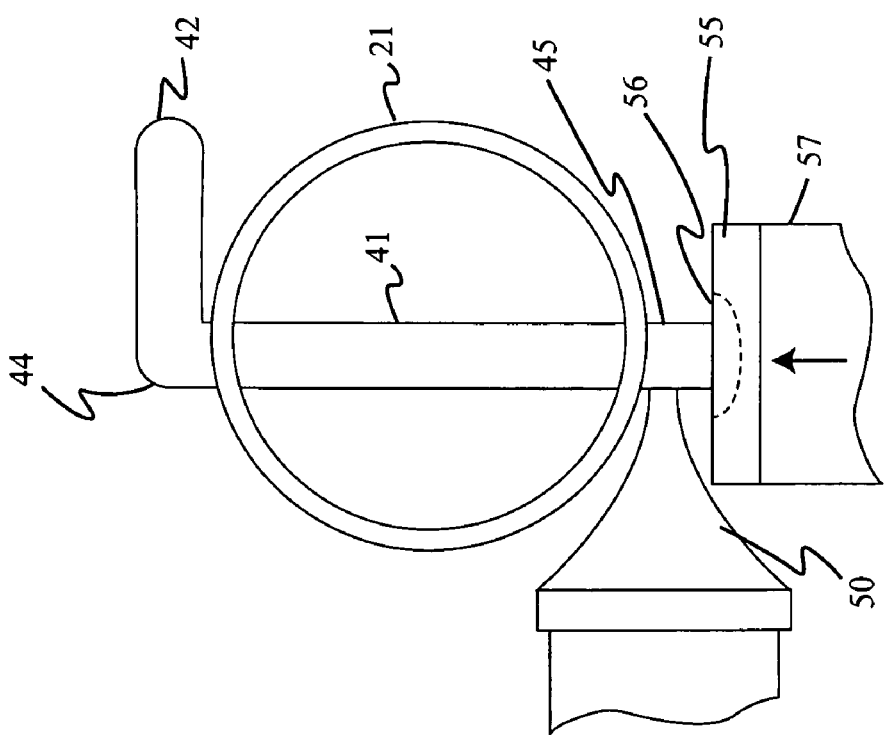
FIG. 4A is an illustration of the application of electrodes to the ends of the wire according to the present invention.

Accordingly, as depicted in FIG. 4A, when bonding formed wire 40 to tube 20, both first electrode 50 and anvil electrode 55 contact only the distal portion of leg 41 that has proceeded completely through tube 20. In this fashion, only end 45 of formed wire 40 is rendered into a plastic state, and after first electrode 50 is removed from contact, anvil electrode 55 with die head configuration 56 presses against end 45. Since leg portion 41 has not been rendered into a plastic state, it provides support when end portion 45 is flattened to conform to the shape of die portion 56, thereby bonding or locking formed wire 40 into a fixed relation with tube 20.

It can be seen that a part of the locking or bonding action between formed wire 40 and tube 20 is accomplished by the upset forging causing the distance between bend 44 on a first side of the tube 20 and flattened end 45' to be exactly the diameter of the tube 20. Thus it is especially desirable when utilizing the present technique without a mounting bracket for the wire 40 or a pressure plate to more broadly disperse the stress applied by flattened end 45 to tube 20 by forces acting on wire 40, and that leg 41 have a bend 44 of at least about 900, and typically less than about 1600, between the leg portion 41 and the remainder of the formed wire 40.

Figure 6:
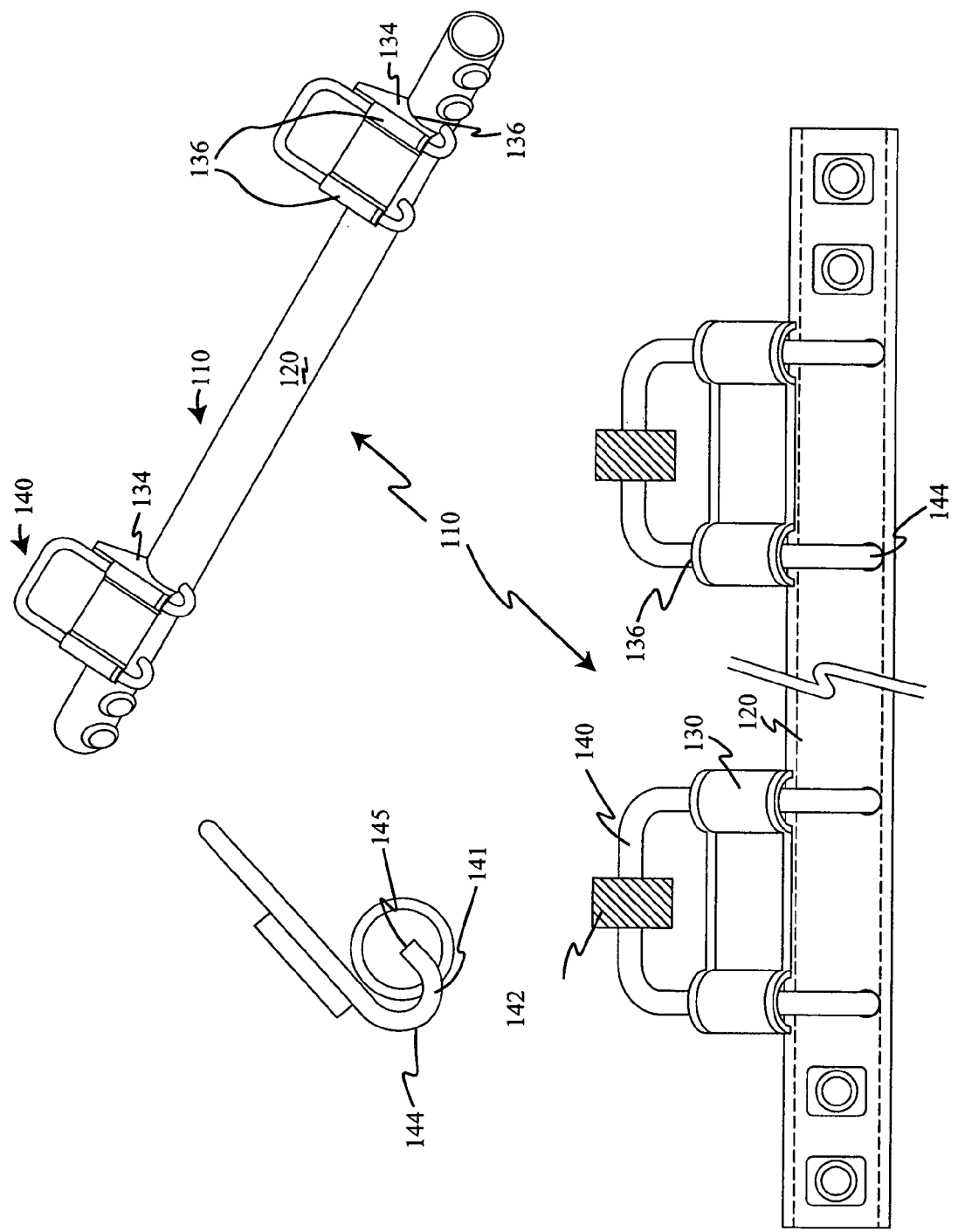
FIG. 6 depicts an ISOFIX support bar with two ISOFIX anchors welded to a tube according to the prior art.

A particular application of upset forging of formed wire to metal tubes will further explain the benefits of the invention. This application is the manufacture of ISOFIX supports. Fixed anchor points for securing child safety seats in automobiles are now generally preferred or required in order to ensure the proper mounting of child safety seats in automobiles. The term "ISOFIX" refers to an international standard developed by the International Standards Organization. Other terms that have the same or similar meaning include a generic term such as "lower universal anchorage system", "LATCH" or lower anchors and tethers for children, CANFIX which refers to the standard developed in Canada. The goal of any "universal" child seat anchoring system is to permit compatible installation of different child safety seats in different cars. Thus, any references in this patent application to the term "ISOFIX" would be considered to include or suggest application to any other universal anchorage system. ISOFIX anchors such as may be provided by wire loop 70 in FIGS. 5A through 5C are therefore necessary in the bight 63 of automobile seats between the bench portion 61 and the back portion 62. In this fashion, a strap 64 holding a clip 66 may be attached between child safety seat 60 and wire loop 70 on either side of safety seat 60 to ensure the secure mounting of safety seat 60 to the automobile. As illustrated in FIG. 5C, wire loop 70 is simply mounted to a flat metal bar 71. Flat metal bar stock is relatively heavy and expensive in comparison to metal tubing of comparable strength. Accordingly, as shown in FIG. 6, an improved prior art ISOFIX support utilized a tube 120 with a metal loop 140 having ends 145 engaged within the tube and held in place on the tube by a mounting bracket 130. The mounting bracket 130 was then fixed by spot welds 136 to the tube 120.

As shown in FIG. 6, the metal loop 140 has a central portion 142 extending to a bend 144 and then a very short leg portion that extends only partially across the interior of tube 120 terminating in the end 145. The bend 144 is typically approximately 180° in order to maximize the strength of ISOFIX support 110 when central portion 142 of metal loop 140 is pulled away from tube 120. The mounting bracket 130 has wings 134 which are fixed by welds 136 to the tube 120. Each wing 134 joins to a curved section 136 which engages a side of metal loop 140 and connects to a central plate portion 135. The curved section 136 acts to constrain the movement of the metal loop 140 in conjunction with wing 134 and welding.

Figure 7:
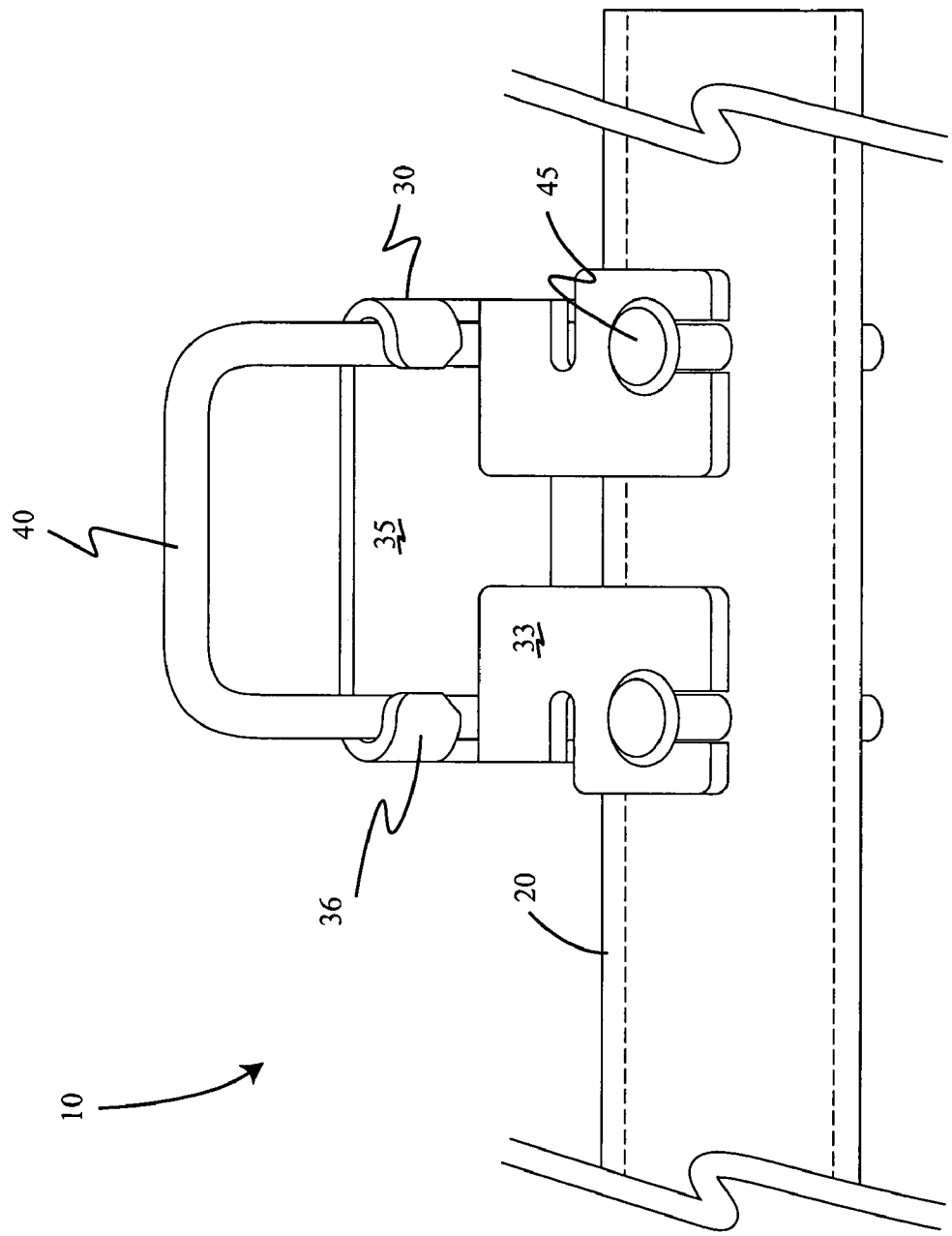
FIG. 7 is a plan view of an ISOFIX support bar manufactured according to the present invention.

This structure suffers from all of the shortcomings of welding, including the possibility of faulty welds 136 between the bracket 130 and tube 120, the possibility of burn through of the tube 120 weakening the tube's strength, and the possibility of weld splatter or slag with resulting defects. In addition, the welding process is inherently slow in comparison to upset forging. Accordingly, an improved ISOFIX support 10 utilizing upset forging according to the present invention is described in FIGS. 7 and 8.

Figure 8A:
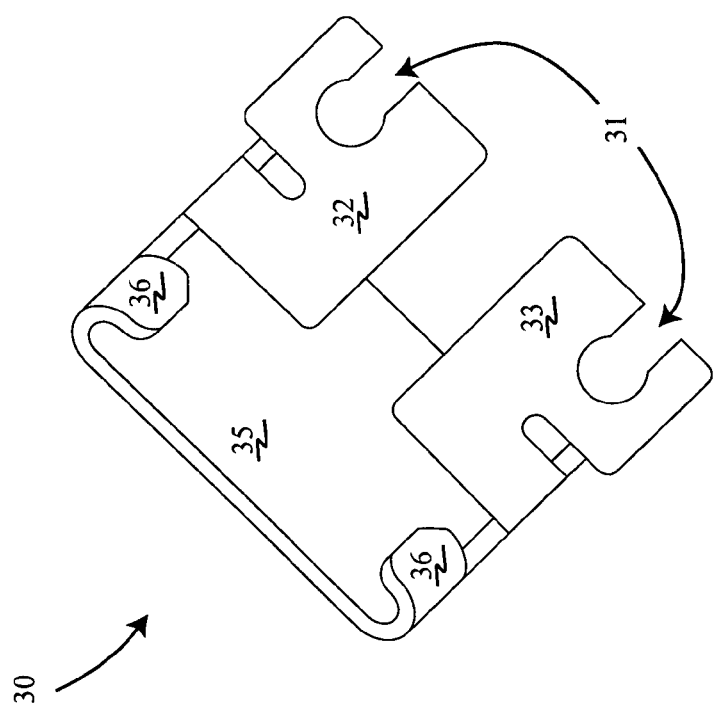
FIG. 8A is a perspective view of a bracket component of an ISOFIX support bar according to the present invention.

The improved ISOFIX support 10 is also generally constructed of a tube 20, a support bracket 30, and a metal loop 40. As shown in FIG. 8A, the bracket 30 has a central plate portion 35 with curved wire engaging panels 36 at one end and wings 34 at the opposite end. Wings 34 support right and left back plates 32, 33 which contain slots to receive the end portions 45 of wire loop 40. The curved engaging panels 36 constrain movement of the wire loop 40 relative to the support bracket 30, and may encompass more than half the circumference of the wire. Curved engaging panels 36 may also co-operate with wings 34 to assist in maintaining the orientation of wire loops 40 with respect to tube 20 after upset forging.

Figure 8B:
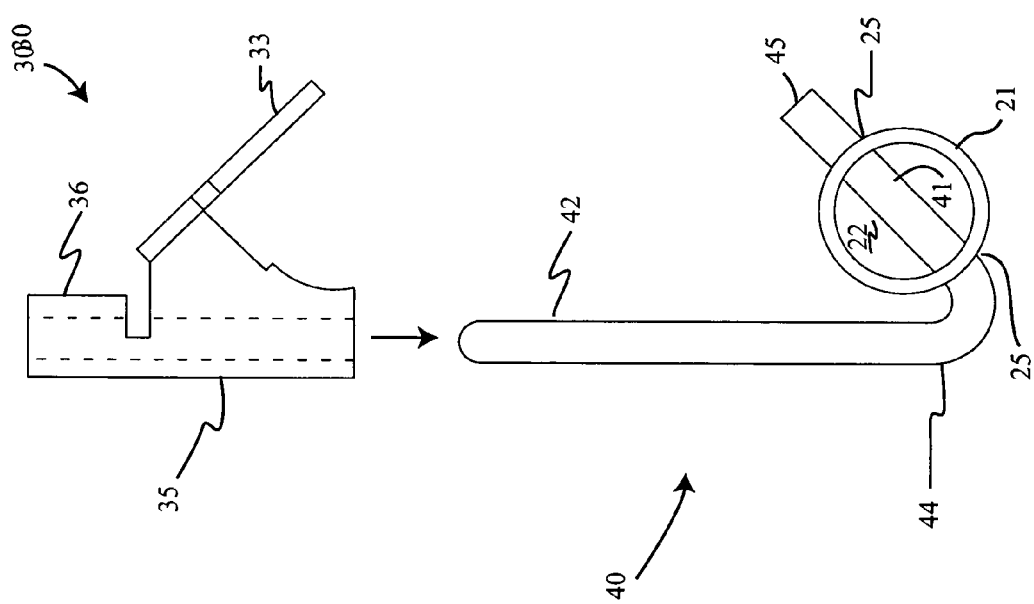
FIG. 8B is an end view of the components of an ISOFIX support bar according to the present invention showing mounting of the bracket of FIG. 8A.
Figure 8C:
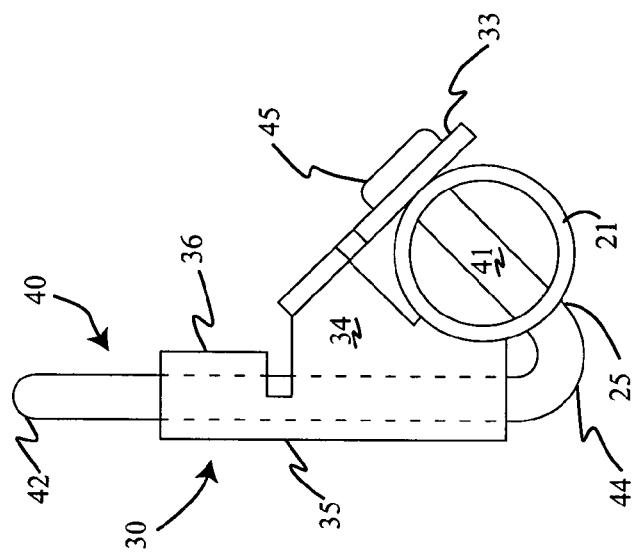
FIG. 8C is an end view of an ISOFIX support bar manufactured according to the present invention.
Figure 8D:
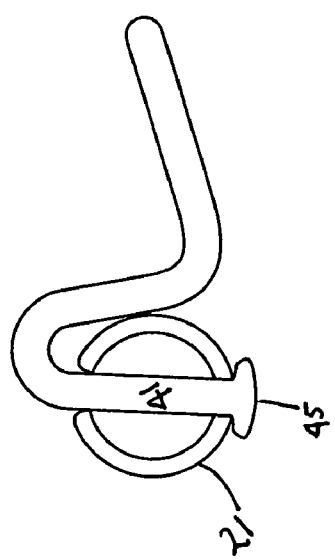
FIG. 8D is an end view of an alternate embodiment of the present invention, wherein a wire is provided with a double bend to enhance joint strength between the tube and the wire.

As shown in FIG. 8B, formed wire loop 140 has ends 45 inserted through first apertures 25 of tube 20 such that legs 41 extend substantially across interior lumen 22 of tube 20 and exit through opposite second apertures 25'. A bend 44 of approximately 135° separates the central portion 42 of formed loop 140 from leg portion 41. The bracket 30 then slides over central portion 42 of loop 40 such that curved supports 36 on either side of front plate 35 tend to support the sides of loop 40, and a portion of each wing 34 rests on wall 21 of tube 20 and positions back plates 32,33 so that ends 45 protrude through slots 31 therein. After upset forging according to the present invention, ends 45 are flattened into upset ends 45' on back plates 32, 33. Back plates 32, 33 serve to provide a flat surface for an anvil electrode to work against, and in use serve to disperse any pressure applied to wire 40 across a greater area of tube 20 than would otherwise be the case. Thus, the use of a plate both facilitates the upset forging process and strengthens the joint between the formed wire 40 and tube 20. Similarly, as shown in an alternate embodiment in FIG. 8D, a leg 41 of pre-formed wire 40 may be inserted through first apertures 25 of tube 20 such that legs 41 extend substantially across interior lumen 22 of tube 20 and exit through opposite second apertures 25'. Then, the upset forging process of the present invention is utilized to strengthen the joint between the formed wire 40 and tube 20. It is seen that the formed wire 40 is provided with an additional or second bend, which second bend preferably touches tube 20, to provide additional strength. Independent laboratory testing has revealed that the prior art provides a mean of 1875 pounds pull force to failure with a CPL or Cpk of 0.59—against a LSL requirement of 1573 pounds. Under the present configuration of FIG. 8D, the present invention provides a mean of 5358 pounds pull force to failure with a CPL or Cpk of 1.83—in essence the wire itself fails before the ISOFIX tube joint anchor fails, and this remarkable result is obtained without the use of any secondary bracket 30.

FIGS. 9A through 9D illustrate the method of forming the upset end 45' that holds the formed wire 40 and bracket 30 securely in place on tube 20. Specifically, tube 20 with both brackets 30 and formed wires 40 positioned thereon is placed in cradle 78 of upset press 69. Power supply 70 provides current via first electrode cables 71 and second electrode cables 72 to first electrodes 74 and second anvil electrodes 75, respectively. Linear actuators 73, which may be hydraulic, pneumatic, or electronic in operation, enable first electrodes 74 and second anvil electrodes 75 to be brought into proximity to the tube, bracket, and wire assembly.

Figure 9A:
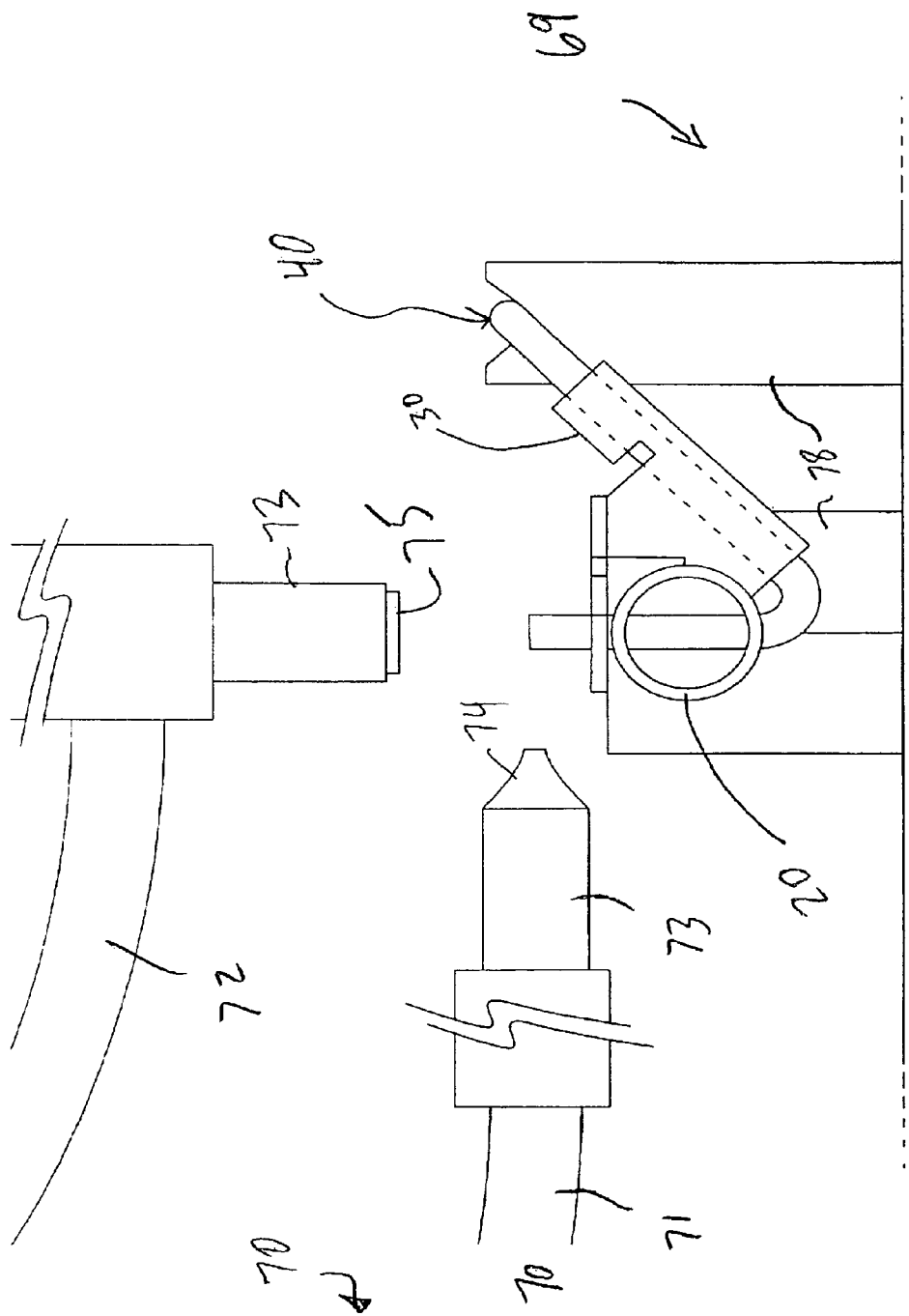
FIG. 9A shows the positioning of a tube and formed wire in an upset forging device according to the present invention.
Figure 9B:
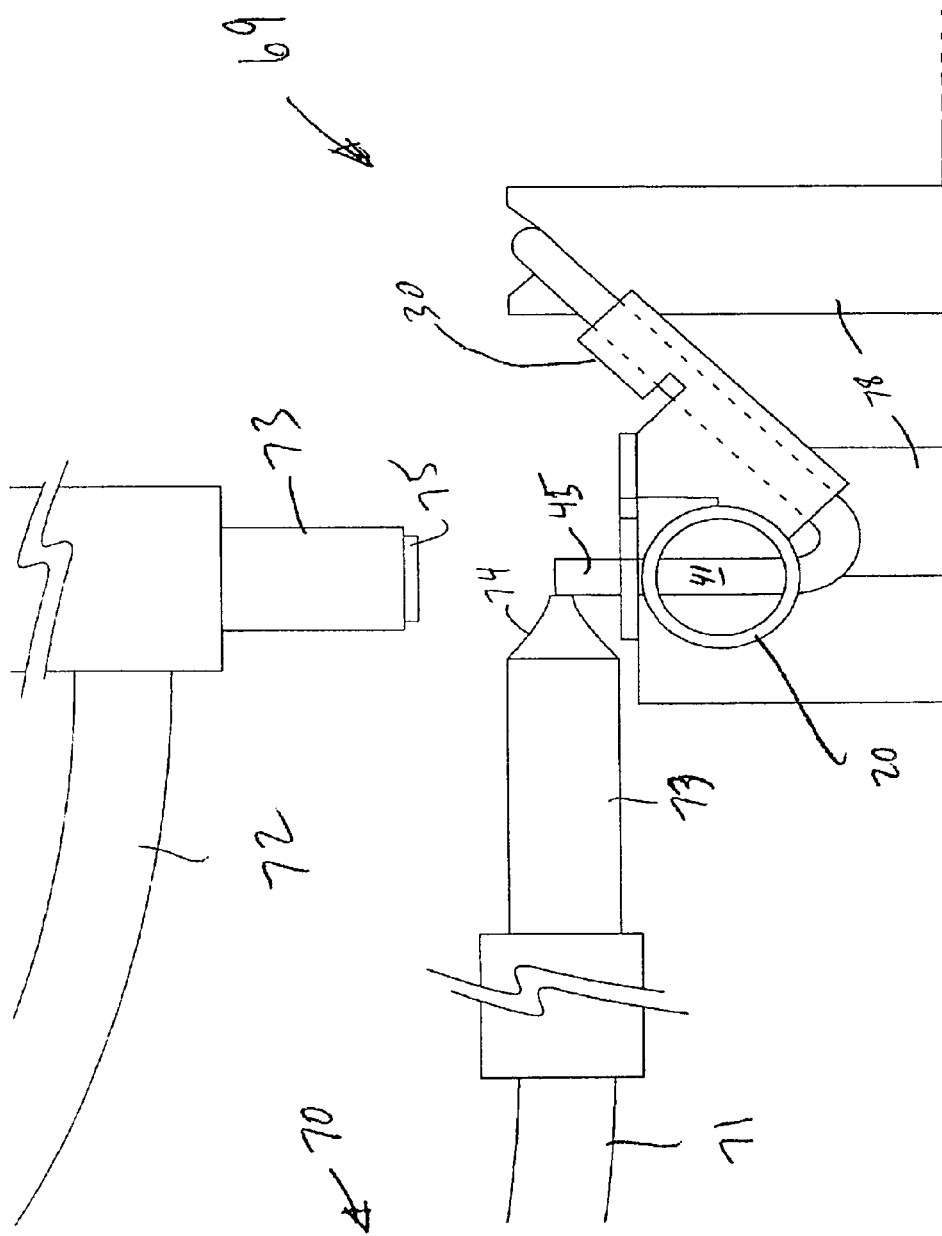
FIG. 9B shows the contact of electrodes to the ends of the formed wire according to the present invention.
Figure 9D:
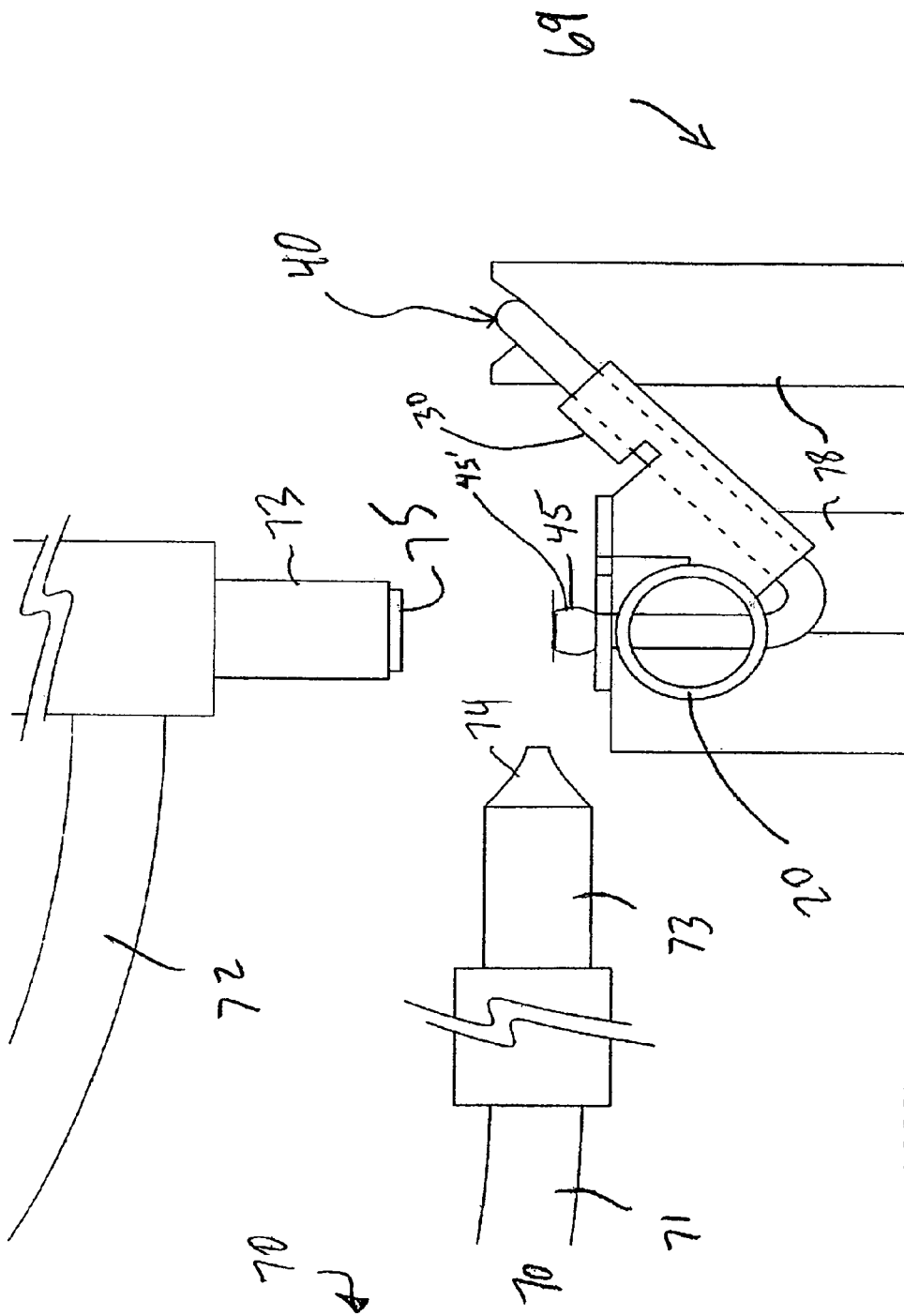
FIG. 9D shows the completion of the hot upset forging of formed wire components to a tube according to the present invention.

As shown in FIG. 9B, first electrodes 74 are brought into contact with the portions of wire legs 41 that have extended completely through the lumen of tube 20 and the slots 31 of back plates 32, 33. The second anvil electrodes 75 contact the ends 45 of legs 41 of wires 40. The resulting flow of current through this segment of the wire 40 heats the segment and renders it plastic. As shown in FIG. 9C, first electrodes 74 are retracted by linear actuators 73 from the plastic wire segments, and second anvil electrodes 75 are pressed against the plastic end portions 45 of wires 40, thereby upsetting the wire ends 45 into the die shape within the anvil ends 75 and creating an upset end 45' that locks the bracket back plates 32, 33 against tube 20. The upset forged joinder can be seen in FIG. 9D when linear actuators 73 withdraw second anvil electrodes 75 from the now complete ISOFIX assembly 10. The resulting structure is not generally welded as that term would be understood to connote the actual fusing of different metal pieces into a single piece, but instead creates a more mechanical locking of the wire, bracket, and tube together as a unit. The joinder of parts is so structurally sound that in preliminary laboratory testing, the lock between parts did not fail, but instead the tube structure failed under forces in excess of 20,000 newtons.

As reflected in FIGS. 10A and 10B, the upset forging process has widespread utility in joining wire to tubing. Depicted in FIG. 10A is a tube structure 210 formed from a first bent tube 320 having first end 323 and second end 324 and a second straight tube 220 having first end 223 and second end 224, wherein the first ends 323, 223 and second ends 224, 324 are welded together to create a generally rectangular frame. Criss-crossing the frame are linear wires 240, each having central sections 242, bends 244, and leg portions 241 proceeding through the interior of the tubes 320, 220 as shown in FIG. 10B, and upset heads 245' locking the wires 240 to the tubes 320, 220. Due to the approximate 90° bends 244, and the fact that each end of formed wires 240 is fastened to the tubular framework, a bracket or pressure plate is not deemed necessary for this structure. However, in some instances it would be desirable to include a plate between tubes 320,220 and upset ends 245 or to include a bracket having such a plate. A bracket may help better position the wire 240 and a pressure plate may facilitate the upsetting of wire end 245 and better disperse the pressure applied against the tubing by the upset end 245' when force is applied to central sections 242 of wires 240. Also shown joined to curved tube 320 are additional formed wires 340. Wires 340 have ends 345' that have been upset forged as shown in FIG. 10B, leg portions 341 extending through the interior lumen of tube 320, bends 344, and central sections 342.

Prior art joining of wires 340, 240 to a tube structure of this type would have involved inserting wire ends through holes on one side of the tubes but with the wire ends not extending completely through the tubes to exit on the opposite side. Instead, there would be some welding of the wire near the bent portions 344, 244 to the tube walls. This welding introduces the chance of burn through or other structural damage to the tube, weakening the resulting structure. In addition, weld splatter could introduce cosmetic blemishes on the part that would require additional finishing, and weld splatter might result in rattling noise from within the hollow tubing.

Furthermore, inspection of the welds between wire and tube without sophisticated and time consuming imaging technologies is impractical. In contrast, the upset forging joining process of the present invention is subject to both accurate visual inspection and even machine vision quality control because only the shape of the wire ends 45' is necessary for effective joining of the wire to the tube and not an actual fusing together of metals from different pieces as required for welding.

Figure 11A:
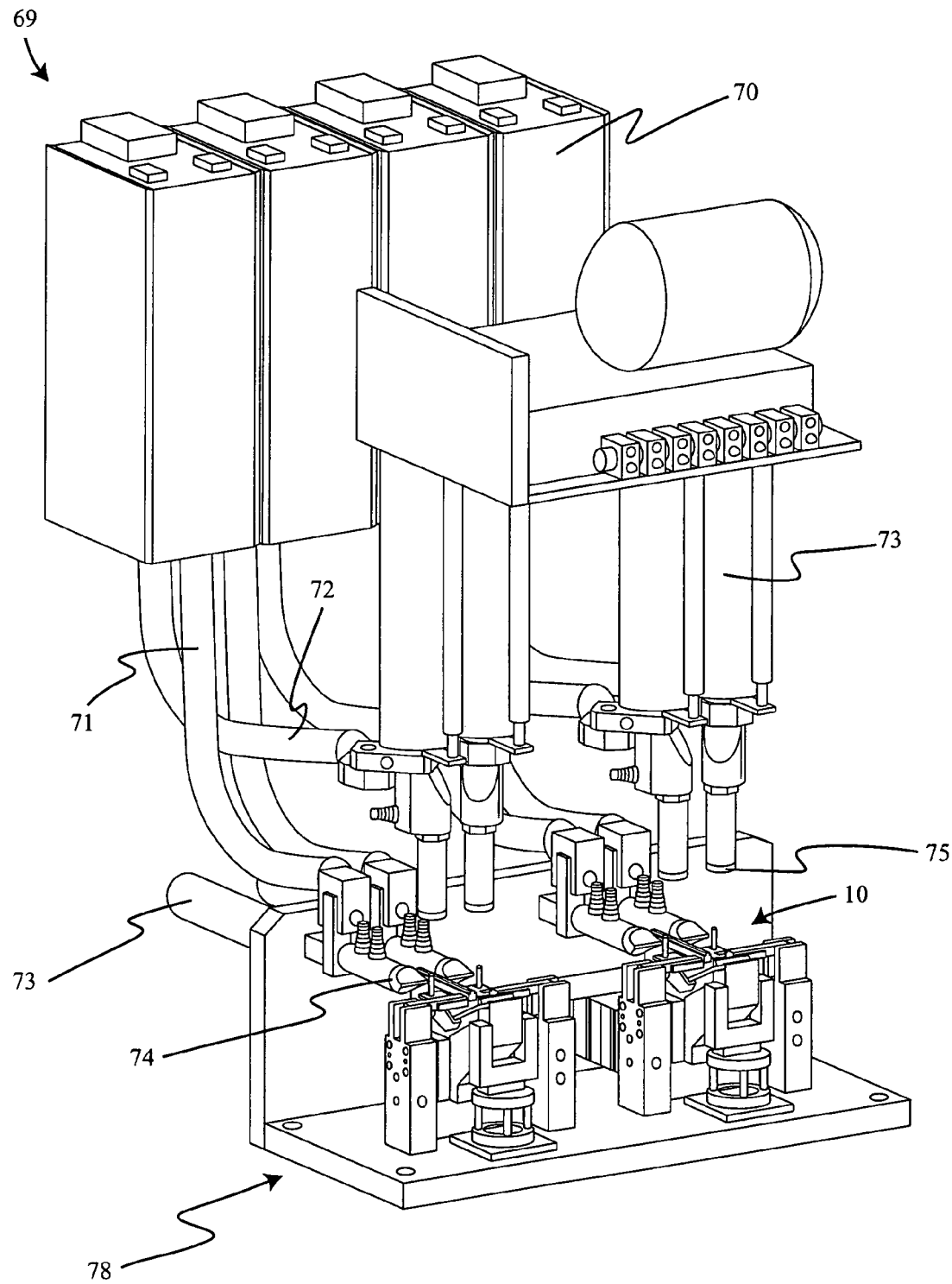
FIG. 11A is a perspective view of an upset press utilized in the present invention.

Upset press 69 is disclosed in greater detail in FIGS. 11A through 11D. In FIG. 11A, the entire upset press 69 is shown with cradle assembly 78 holding as yet unforged ISOFIX assembly 10 components. Power supply 70 provides current via first electrode cable 71 and second anvil electrode cable 72 to first electrode 74 and second anvil electrode 75 respectively. Linear actuators 73 enable first electrode 74 and second anvil electrode 75 to be brought into proximity to the ISOFIX assembly 10.

Figure 11B:
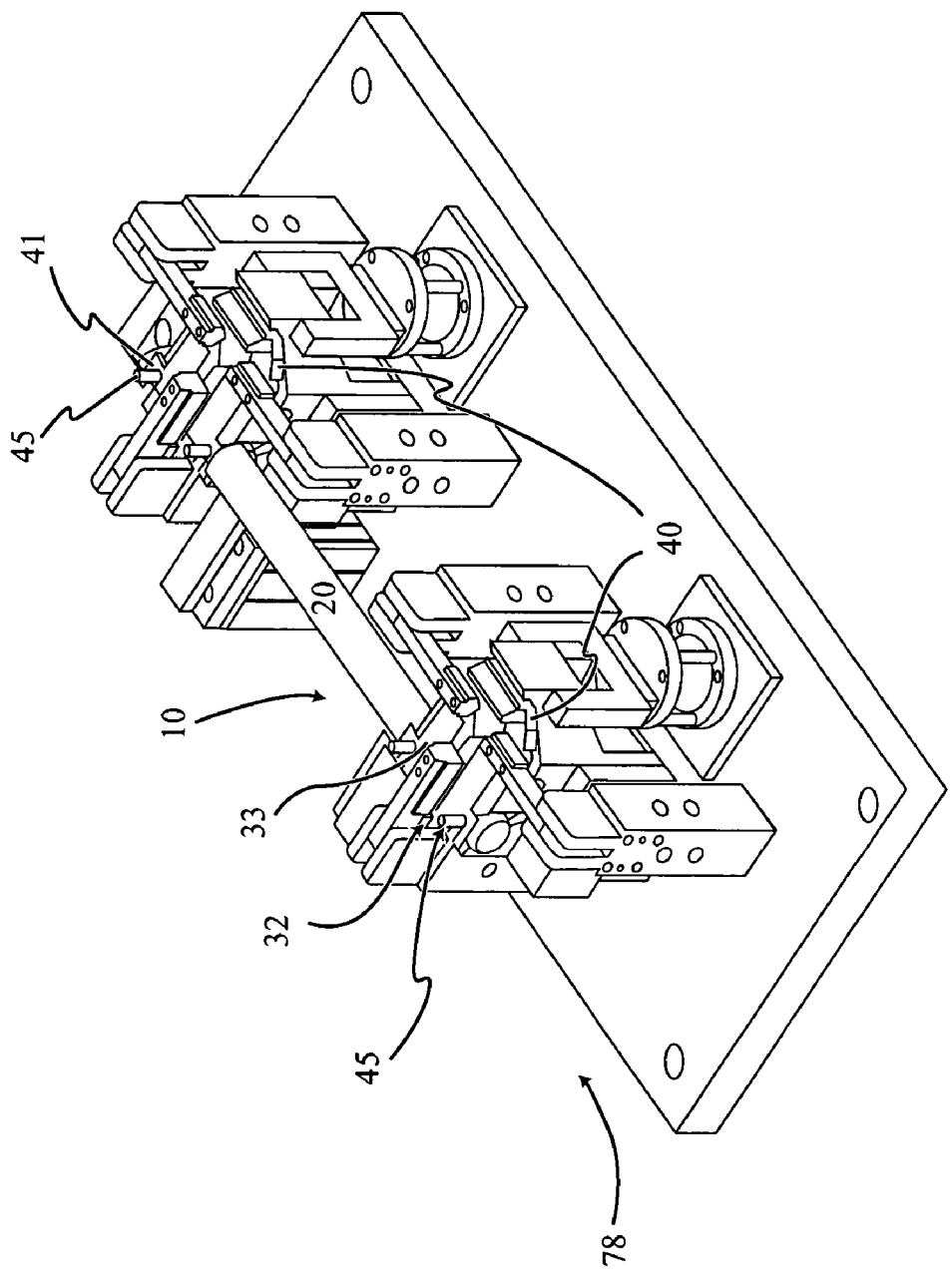
FIG. 11B is a perspective view of the cradle of the upset press of FIG. 11A holding tubing and the formed wire to be heated and forged.

The cradle 78 is shown in isolation in FIG. 11B with unforged ISOFIX assembly 10 and specifically the protruding leg portions 41 and ends 45 that will be contacted by first electrode 74 and second anvil electrode 75 respectively during the upset forging process. Central portions of wire loops 40 are held in position and the back plates 32, 33 are upward facing for most advantageous upset forging.

Figure 11C:
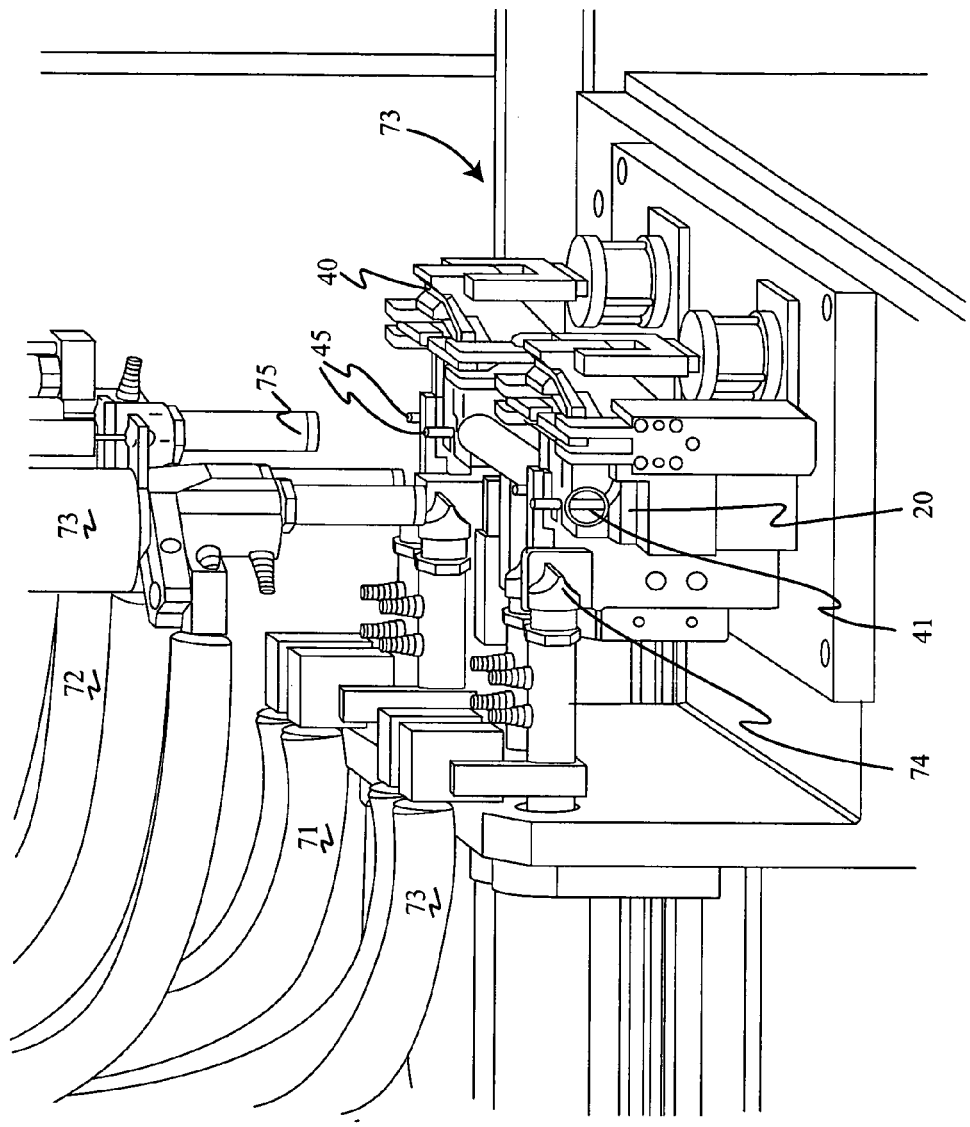
FIG. 11C is a perspective view of the business portion of the upset press of FIG. 11A in isolation.
Figure 11D:
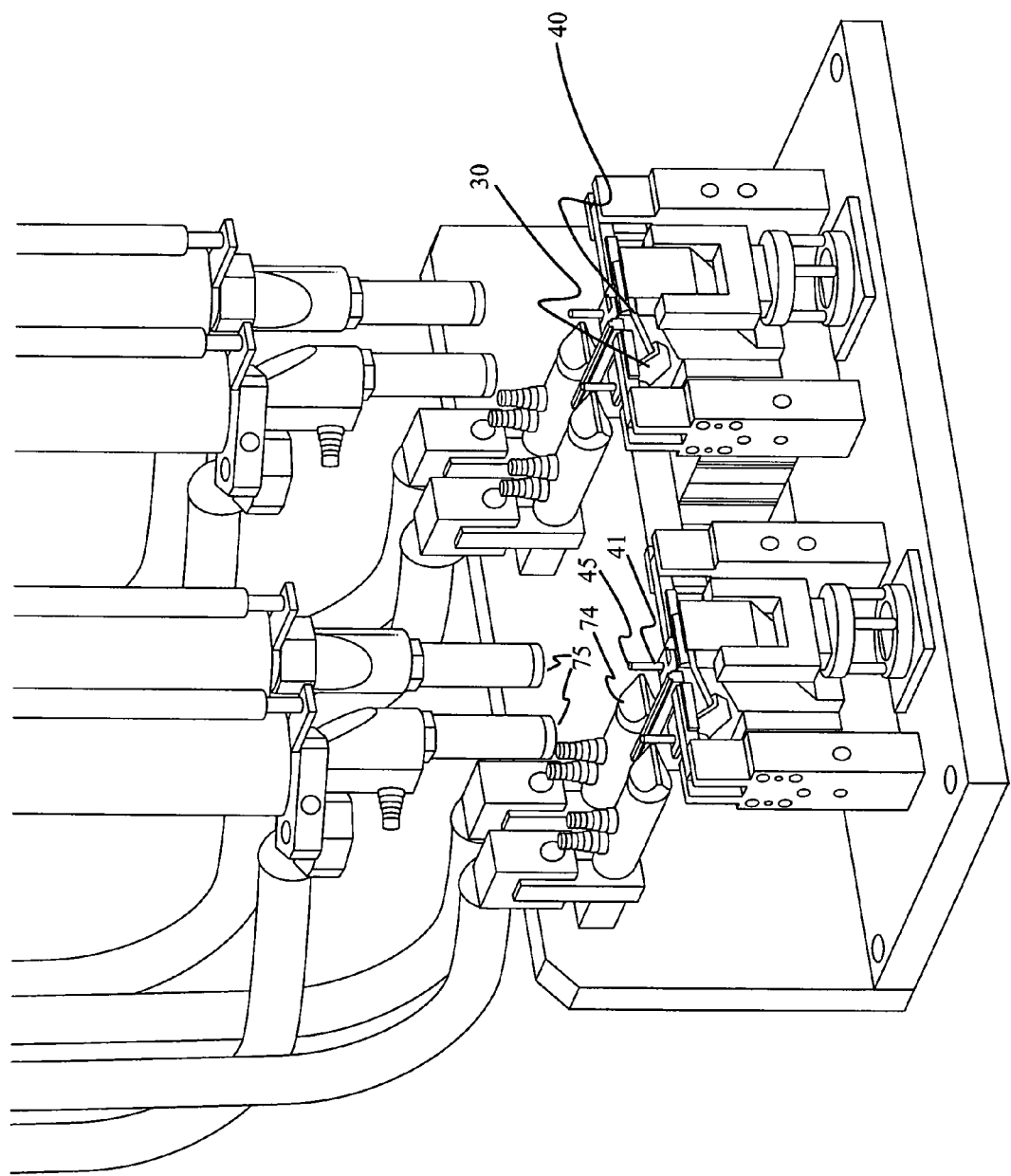
FIG. 11D is another perspective view of the business end of the upset press of FIG. 11A.

FIGS. 11C and 11D offer slightly varied perspective views of the business portion of upset press 69 with pairs of first electrodes 74 and second anvil electrodes 75 positioned to contact both ends 45 and legs 41 of each of wire loops 40. In FIG. 11C, the lumen of tube 20 is visible with the portion of leg 41 interior of the lumen not to be heated by current flowing between electrodes 74, 75.

The upset forging process described does consume electric power to provide the resistance heating necessary to bring the wire ends to a plastic state. In addition, there will be some consumption of electrodes over time. This consumption of power and electrodes is substantially less costly than the gas, wire and welding equipment consumed in prior art manufacturing.

Numerous alterations of the structures and methods herein described will suggest themselves to those skilled in the art. It will be understood that the details and arrangements of the parts which have been described and illustrated in order to explain the nature of the invention are not to be construed as any limitation of the invention. All such alterations which do not depart from the spirit of the invention are intended to be included within the scope of the appended claims.

What is claimed is:

1. A method of joining formed u-shaped wire having a u-shaped portion, a straight portion at the ends of said u-shaped wire, and a bent portion disposed between said straight portion and said u-shaped portion to a tube comprising:
    inserting said straight portion of an end of said u-shaped wire through and past the diameter of a hollow tube, until said bent portion directly contacts said tube; and
    securing said wire to said tube by hot upset forging said end of said wire, wherein said hot upset forging uses a first electrode and a second electrode, said first electrode and said second electrode being positioned on the same side of the hollow tube such that both of said first electrode and said second electrode contact only a distal portion of said straight portion.

2. A method of joining formed wire to a tube according to claim 1, further comprising:
    selecting a sufficient length of the wire that will provide enough material for hot upset forging.

3. A method of joining formed wire to a tube according to claim 1, further comprising:
    providing a supporting bracket for said wire.

4. A method of joining formed wire to a tube according to claim 1, wherein said formed wire has an additional bent portion between said bent portion and said straight portion.

* * * * *